2 Sheets—Sheet 1.
J. O'BRIEN.
MINE TRAP DOOR.
No. 11,551. Reissued June 30, 1896.
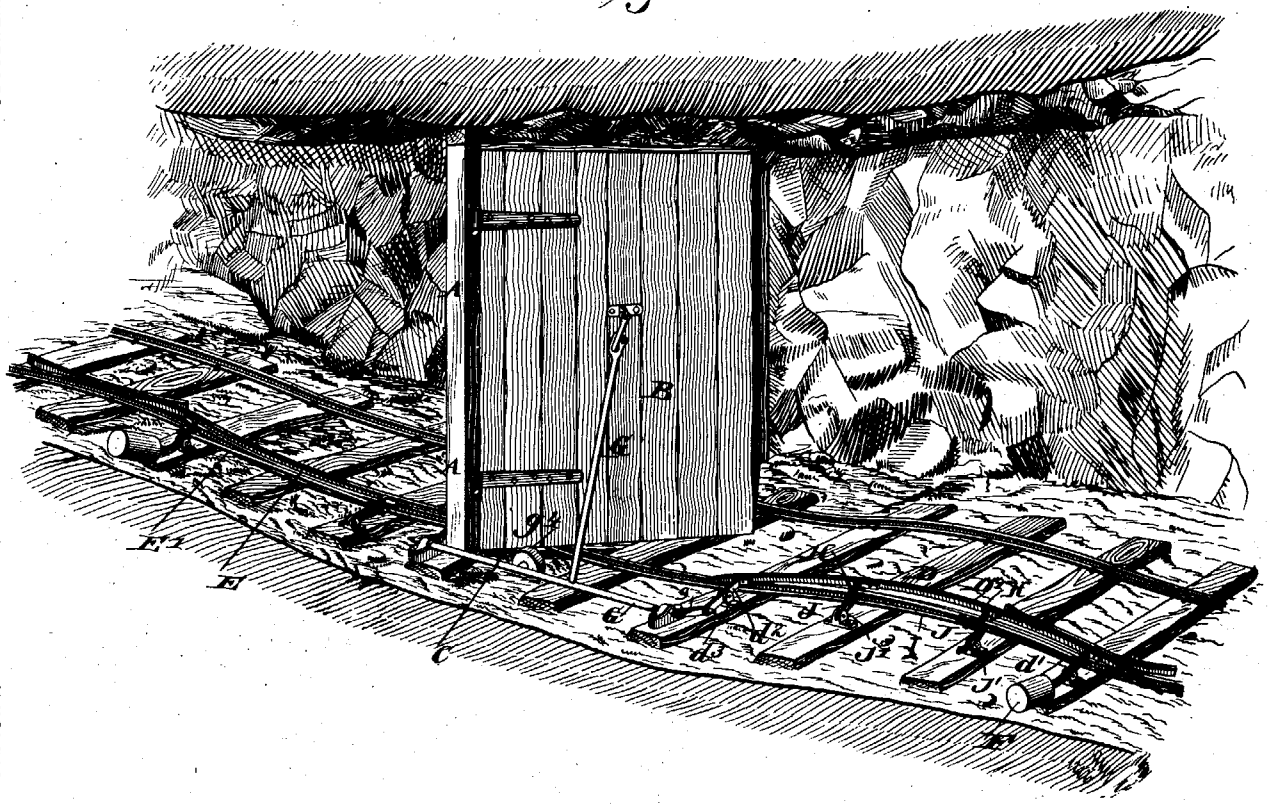
WITNESSES:
H. G. Dieterich
Chas. S. Brock
INVENTOR
James O'Brien
BY
O'Meara & Co.
ATTORNEYS 2 Sheets—Sheet 2.
J. O'BRIEN.
MINE TRAP DOOR.
No. 11,551. Reissued June 30, 1896.
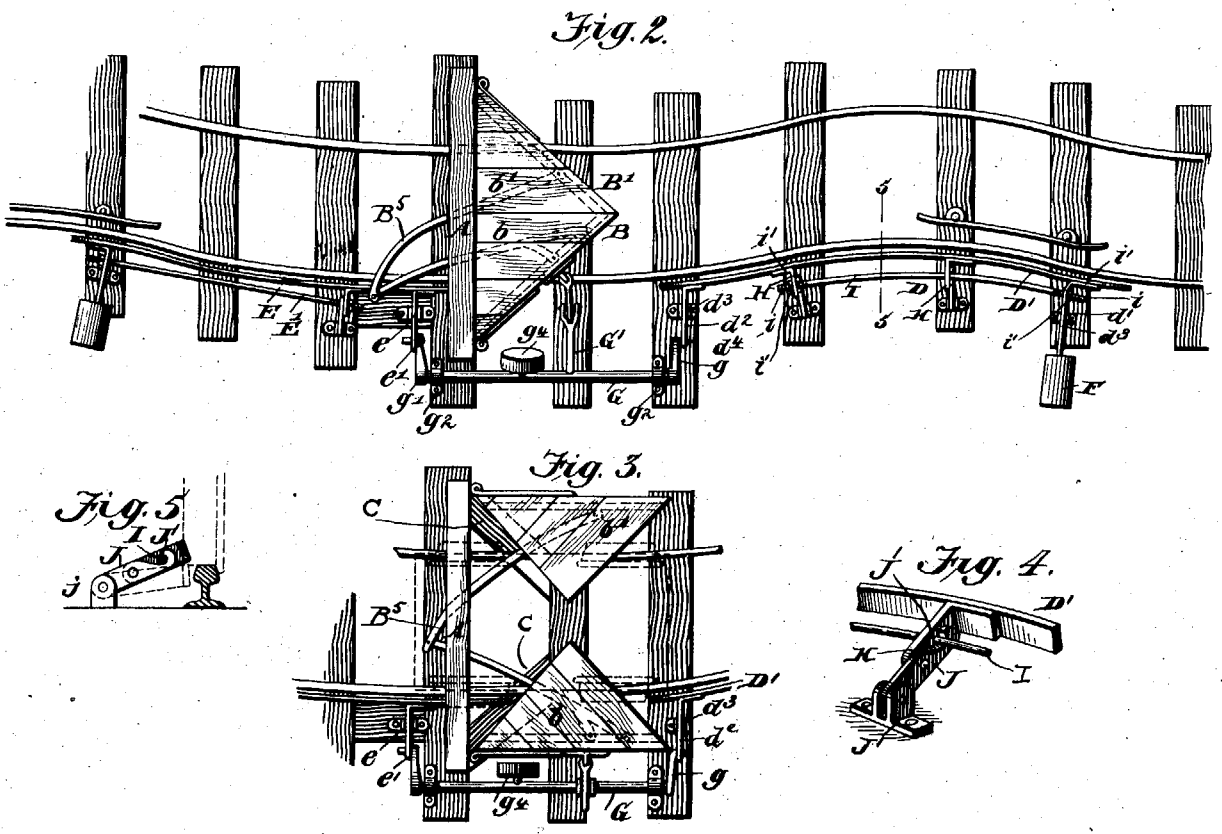
WITNESSES:
H. G. Dieterich
Chas. E. Brock
INVENTOR
James O'Brien
BY
O'Meara & Co.
ATTORNEYS

UNITED STATES PATENT OFFICE.

JAMES O'BRIEN, OF EVANSVILLE, INDIANA.

MINE TRAP-DOOR.

SPECIFICATION forming part of Reissued Letters Patent No. 11,551, dated June 30, 1896.

Original No. 557,481, dated March 31, 1896. Application for reissue filed May 4, 1896. Serial No. 590,239.

*To all whom it may concern:*

Be it known that I, JAMES O'BRIEN, residing at Evansville, in the county of Vanderburg and State of Indiana, have invented certain new and useful Improvements in Mine Trap-Doors; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in that class of mine-doors which are adapted to cut off or control air-currents in the different portions or compartments of a mine; and such invention primarily has for its object to provide a door of this character, with operating means therefor which can be placed on curved as well as straight portions of the track, and in which the doors are automatically opened or closed by the car as it reaches the doorway from either direction by mechanism of a simple and economical construction.

The invention consists in the peculiar combination and novel arrangement of parts, such as will be first described in detail, and then specifically pointed out in the appended claims, reference being had to the accompanying drawings, in which—

Figure 1 is a perspective view of my improved mine trap-door and operating mechanism, showing the same in their normal position. Fig. 2 is a top plan view of the same, the parts being in the position shown in Fig. 1. Fig. 3 is a top plan view of the door, showing the position of the opposite members thereof as the car passes therethrough. Fig. 4 is a detail view of one of the lever-sustaining chairs hereinafter referred to, and Fig. 5 is a transverse section taken on the line 5 5 of Fig. 2.

Referring to the accompanying drawings, A indicates the door-framing, which is disposed in the mine at the entry, to which the door-sections B B′ are hinged in the manner clearly shown in Figs. 1 and 2, each section having a triangular top piece *b b′*, so that when the door-sections are closed they will meet at an angle, the pieces *b* and *b′* closing the top, suitable pieces C C being disposed between the track-rails and at the outside thereof. (See Fig. 1.)

Two lever-rails D and E are provided, one of which, E, embodies the essential features of my invention, the other, D, being shown without the improved joint members J hereinafter referred to.

By referring now more particularly to Fig. 2 it will be observed the lever mechanism D is disposed adjacent a curved track-section and comprises a lever-rail D′, curved parallel with rail and having at its extremities right-angle extensions $d'$ $d^2$, which are pivoted in brackets $d^3$, one of such extensions $d'$ having a weight F, which serves to hold the lever-rail at a point above the track-rail, as clearly shown in Fig. 5, the member $d^2$ being extended and connected at $d^4$ to a crank member *g* of a rock-bar G, the purpose of which will presently appear. The lever-rail also has a number of extensions H, the number depending upon the length of such rail, which in practice may vary in length to about twelve feet. Through the several extensions H, as also through end extensions $d'$ $d^2$, is passed a truss-rod I, made, preferably, of three-fourths of an inch iron, the ends of which are threaded, as at *i i*, to receive the adjusting and binding nuts *i′ i′*, as clearly shown. The several extensions H are also pivotally joined to chair members J, in turn pivoted in forked brackets *j* and formed with recess ends J′, in which the truss-rod is adapted to rest when pressure is applied to the lever-rail. By connecting the said switch-rail at points between the ends to the chair members by a double pivotal connection, which, when pressure is applied to the said rails, becomes practically a single pivotal joint, provision is made which permits the said rail to adjust itself the more easily at the different points and thereby provide against too great a strain at points intermediate its ends when the car passes thereover.

By constructing the lever-rail over which the loaded car passes in the manner stated—that is, by trussing same and pivotally joining the same to the brackets, as shown—the said lever-rail is sufficiently braced and strengthened to stand the strain put upon it by the passing loaded car without danger of it being bent out of a proper alinement with the rail.

The lever-rail E also has a short truss-rod E′, but has no chair connections intermediate its ends, as such rail is held adjacent a track-section nearly straight. Such rail-section E has an extension $e$, which is connected at $e'$ to a crank member $g'$ of the rock-bar G. This rock-bar is journaled at one side of the gate or door in bearings $g^2$ on the cross-ties and has an upwardly-extending arm G′, which has a link connection with the door-section B, as most clearly shown in Fig. 1, such bar G also having a counterweight $g^4$ to assist in keeping the said bar and lever-rails to their normal positions.

Heretofore the main trouble to overcome in order to get a successfully-operating mine trap-door was the expense attendant upon placing the same, since perfectly straight tracks only could be used. By my improvements the form of my lever-rail is such that it can be fitted to a track of almost any curvature in a manner at once substantial and removable.

The door-sections B and B′ have the ordinary toggle-lever connections $B^5$ to cause them to move in either direction simultaneously.

Having thus described my invention, what I claim, and desire to secure by Letters Patent, is—

1. In a mine trap-door-operating mechanism as described, a lever-rail fitted to a curved track-section having pivotal connections at its extremities with the tie-chairs, and similar connections with the ties between the said extremities having double pivot-joints substantially as shown and described.

2. In a mine-door-operating mechanism as described, a lever-rail having pivotal connections at its extremities with the ties, and similar connections with the ties between the said extremities having double pivot-joints, and a truss or reinforcing rod passed through the ends and intermediate connections, having adjusting-nuts at the ends as set forth and for the purposes described.

3. As an improvement in mine trap-doors, the combination with a curved track-section, the double doors joined to operate simultaneously, the rock-bar G, having an arm connected to one of the said doors and having crank ends, and means for holding the bar G, to its normal position to close the door, of lever-rails arranged at opposite sides of the door, having pivotal connections with the ties and having right-angle extensions connected with the crank ends of the bar G, all arranged substantially as shown and for the purposes described.

4. As an improvement in a mine trap-door-operating mechanism substantially as described the combination with the curved track-section, and the devices for normally holding the doors in a closed position, of the lever-rail D, the brackets $d^3$, said lever-rail held in the brackets $d^3$ and provided with extensions H, the forked brackets $j$, the chair members J, pivoted in the brackets $j$ and pivotally joined to the extensions H, and the truss-rods I, passed through the several extensions H, $d'$ and $d^2$, and provided with adjusting-nuts at the ends all arranged substantially as shown and for the purposes described.

JAMES O'BRIEN.

Witnesses:
WILLIAM M. MADDEN,
P. H. CUNNINGHAM.